(12) United States Patent
Robinson et al.

(10) Patent No.: US 9,870,176 B2
(45) Date of Patent: Jan. 16, 2018

(54) STORAGE APPLIANCE AND METHOD OF SEGMENT DEDUPLICATION

(71) Applicant: FUJITSU LIMITED, Kawasaki-Shi (JP)

(72) Inventors: Alan Robinson, München (DE); Hans-Dieter Schuster, Garching (DE)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/033,265

(22) PCT Filed: Jun. 30, 2014

(86) PCT No.: PCT/EP2014/063828
§ 371 (c)(1),
(2) Date: Apr. 29, 2016

(87) PCT Pub. No.: WO2015/067382
PCT Pub. Date: May 14, 2015

(65) Prior Publication Data
US 2016/0283165 A1    Sep. 29, 2016

(30) Foreign Application Priority Data

Nov. 8, 2013  (EP) .................................... 13192153

(51) Int. Cl.
*G06F 3/06*         (2006.01)

(52) U.S. Cl.
CPC ............ *G06F 3/0664* (2013.01); *G06F 3/061* (2013.01); *G06F 3/067* (2013.01); *G06F 3/0638* (2013.01); *G06F 3/0641* (2013.01); *G06F 3/0656* (2013.01); *G06F 3/0685* (2013.01); *G06F 3/0686* (2013.01)

(58) Field of Classification Search
CPC .... G06F 3/0641; G06F 3/0656; G06F 3/0682; G06F 3/0686
USPC ................................................. 711/111, 112
See application file for complete search history.

(56) References Cited

U.S. PATENT DOCUMENTS

| | | |
|---|---|---|
| 6,963,958 B2 | 11/2005 | Linder |
| 8,131,924 B1 | 3/2012 | Frandzel et al. |
| 2008/0301134 A1 | 12/2008 | Miller et al. |
| 2010/0180075 A1 | 7/2010 | McCloskey et al. |
| 2011/0145523 A1 | 6/2011 | Gupta et al. |
| 2011/0307447 A1* | 12/2011 | Sabaa ................. H04L 67/2842 707/637 |
| 2012/0323860 A1* | 12/2012 | Yasa ................. G06F 17/30156 707/692 |
| 2013/0318051 A1* | 11/2013 | Kumar ............. G06F 17/30156 707/692 |
| 2014/0344229 A1* | 11/2014 | Lillibridge ........... G06F 3/0608 707/692 |
| 2016/0306853 A1* | 10/2016 | Sabaa ................. H04L 67/2842 |

OTHER PUBLICATIONS

Lillibridge et al, "Spares Indexing: Large Scale, Inline Deduplication Using Sampling and Locality", 7th USENIX Conference onFile and Storage Technologies. 2009.*
M. Lillibridge, et al., "Sparse Indexing: Large Scale, Inline Deduplication Using Sampling and Locality", 7th USENIX Conference on File and Storage Technologies; Fast 2009, USENIX Association, USA; San Francisco, CA.
Anonymous, "ZFS Deduplication: To Dedupe or not to Dedupe . . . " Jul. 27, 2011, XP055134494, Retrieved from the Internet: URL: http://constantin.glez.de/blog/2011/07/zfs-dedupe-or-notdedupe.

* cited by examiner

*Primary Examiner* — Than Nguyen
(74) *Attorney, Agent, or Firm* — Fujitsu Patent Center

(57) ABSTRACT

Ingest data for virtual volumes (V) is split into segments (B1, B2, B3, B4) of a size that can be buffered in main memory. Data deduplication processing then occurs directly on the segments (B1, B2, B3, B4) in main memory, without the need for disk I/O.

20 Claims, 3 Drawing Sheets

STORAGE APPLIANCE AND METHOD OF SEGMENT DEDUPLICATION

TECHNICAL FIELD

This disclosure relates to a storage appliance comprising an interface that provides access to at least one virtual tape drive for at least one host computer and a method of segmenting a volume of data provided by an application to a storage virtualization appliance.

BACKGROUND

Storage appliances of different kinds are known. One particular type of storage appliance is a virtual tape library (VTL). Virtual tape libraries emulate one or several physical tape drives to write and read tape volumes by an application program running on a host computer. The tape volumes received from the host computer may be stored in different forms, e.g. on an internal file system of the virtual tape library or on physical tape volumes attached to a back-end storage system. A possible system architecture of such a virtual tape library is described, for example, in U.S. Pat. No. 6,963,958 B1. ETERNUS CS High End of Fujitsu Technology Solutions GmbH is such a storage virtualization appliance that emulates a physical tape library. It provides virtual tape drives for I/O and logical volumes on which data is stored.

Virtual tape libraries are often used for regular backup of large data sets such as central data stores of medium to large companies and data centers. Due to the nature of the backup procedure and the respective data sources, typically more or less the same data is stored many times, resulting in redundant storage and thus waste of resources.

To improve resource utilization, more recently, systems and methods of data deduplication, sometimes referred to as "de-dupe" or "dedup", have been developed. For example, U.S. Pat. No. 8,131,924 B1 discloses a system and method of deduplication of data stored on tape.

With a deduplication engine integrated into a storage appliance, it becomes possible to store virtual volume data in deduplicated form using only a fraction of physical disk space of a virtual storage appliance.

Deduplication engines store data as objects. Once an object was stored, it is possible to retrieve or to delete it. However, it is not possible to modify an existing object.

One possible method of storing a tape volume in a virtual tape library is to buffer the volume data on internal disks and perform offline deduplication by reading the data from disk, applying the deduplication algorithm and storing the reduced data.

Offline deduplication requires additional disk storage resources and causes more I/O cycles to store a piece of data into the deduplication engine. This means higher costs and performance penalties.

Therefore, it could be helpful to provide improved storage systems and methods of the kind described above.

SUMMARY

We provide a storage appliance including an interface that provides access to at least one virtual tape drive for at least one host computer; a first database that stores metadata about virtual tape volumes received via the interface, at least one volatile main memory; and a deduplication engine that deduplicates storage objects; wherein each virtual tape volume is represented within the storage appliance as an ordered set of segments of data and the storage appliance is configured to perform the following steps:

providing, from the volatile memory, at least one buffer memory to store a segment of data;

receiving a data stream representing a virtual tape volume of the at least one virtual tape drive at the first interface;

filling the buffer memory with data from the received data stream until the received data stream is closed, and a synchronization point of the virtual tape volume is identified in the received data stream or a predefined amount of data has been stored in the buffer memory;

deduplicating with the deduplication engine the segment of data stored in the at least one buffer memory; and storing the deduplicated segment of data in a non-volatile storage device.

We also provide a method of segmenting a virtual tape volume provided by an application via an interface to a storage virtualization appliance, the storage virtualization appliance including a deduplication engine and at least one memory buffer that stores a segment of the virtual tape volume, wherein the segmentation of the virtual tape volume is based on a tape semantic of the interface of the storage virtualization appliance and is performed by repeating the following steps:

filling the memory buffer with data of the virtual tape volume received from the application until a segment of the virtual tape volume is considered complete, wherein the segment is considered complete when the memory buffer has been filled to a predefined maximum segment size when the application writes a file mark serving as a synchronization point or when the virtual tape volume is closed by the application;

passing a segment of the virtual tape volume for storage to the deduplication engine when the segment is considered complete, and processing, by the deduplication engine, the passed segment of the virtual tape volume directly from the memory buffer for deduplicated storage.

Our storage appliance may comprise an interface to provide access to at least one virtual tape drive for at least one host computer, at least one volatile main memory, and a deduplication engine to deduplicate storage objects. The appliance is configured to perform the following steps:

provide, from the volatile memory, at least one buffer memory to store a segment of data, receive a data stream representing a virtual volume of the at least one virtual tape drive at the first interface, fill the buffer memory with data from the received data stream until the received data stream is closed, a synchronization point of the virtual volume is identified in the received data stream or a predefined amount of data has been stored in the buffer memory, deduplicate, with the deduplication engine, the segment of data stored in the at least one buffer memory, and store the deduplicated segment of data in a non-volatile storage device.

Inline deduplication of data is only possible if the data to be processed fits into main memory.

Virtual volumes with capacities of up to 200 GB will not fit into main memory—at least not if a large number of volumes have to be handled in parallel.

The storage appliance may split ingest data for virtual volumes into segments of sizes that can be buffered in main memory. Data deduplication processing then occurs directly on the segments in main memory without the need for disk I/O. That is, virtual tape volumes received from a host computer can be deduplicated inline rather than offline, using a built-in deduplication engine. Thus, the performance of the storage appliance is improved, reducing the average cost of storage.

Our method of segmenting a volume of data provided by an application to a storage virtualization appliance comprising a deduplication engine comprises the following steps:

defining a maximum segment size, providing at least one memory buffer in main memory for a segment of the volume of data, filling the segment buffer with data of the virtual volume received from the application, passing a segment of the virtual volume for storage to the deduplication engine, when the segment is considered complete, wherein the segment is considered complete when the memory buffer has been filled to the defined maximum segment size, when the application writes a file mark serving as an synchronization point, or when the virtual volume is closed by the application, and processing, by the deduplication engine, the passed segment of the virtual volume directly from the memory buffer for deduplicated storage.

The method enables segmentation of logical tape volumes as required for inline deduplication.

Further examples are disclosed in the appended claims as well as the following detailed description. In the following, multiple examples are described with reference to the attached drawings.

DETAILED DESCRIPTION

Figure 1:
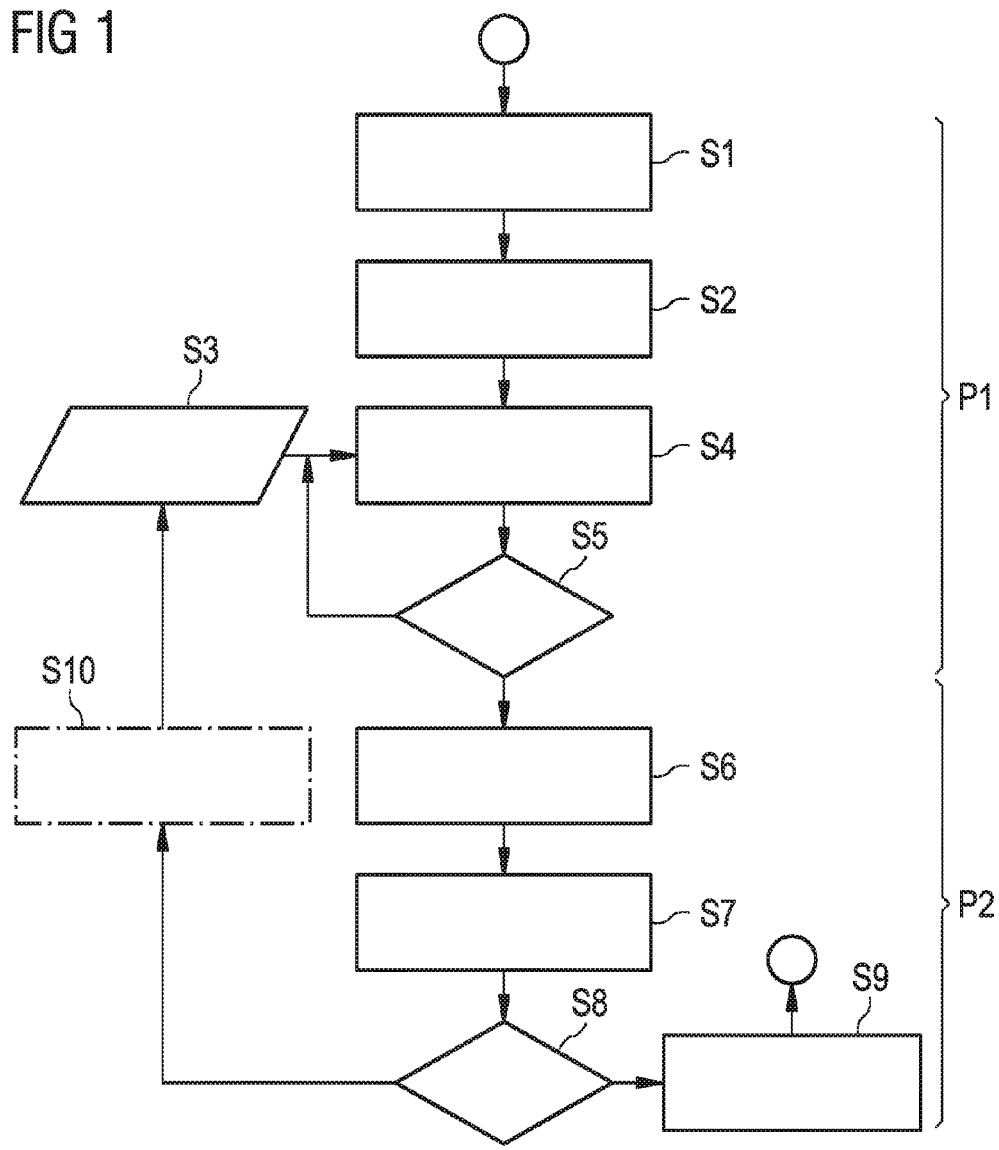
FIG. 1 discloses a flow chart of a method of segmenting a virtual tape volume according to an example.

FIG. 1 shows a flow chart of a method of segmenting a virtual tape volume. The method comprises two parts, i.e. a first part P1 performing the actual segmentation of the incoming data stream received from an application and a second part P2 of processing the individual segments of the data by a storage appliance with an integrated deduplication engine. The deduplication engine may be implemented in hardware or software or a combination of both.

In a first step S1 of the first part P1, a maximum segment size is defined. The maximum segment can be determined based on an amount of main memory available for a particular computer system performing the segmentation. For example, in a clustered storage appliance having one or more cluster nodes configured to receive data streams from an application of a host computer, if the cluster node has a total main memory capacity of 64 GB, and is configured to process up to 128 tape volumes in parallel, a maximum segment size of 128 MB may be used. Other considerations can be included, in particular the average size of the tape volumes processed or a specified minimum, optimum and/or maximum size for deduplication specified by the deduplication engine.

In a step S2, a buffer for a segment of data of the specified segment size is provided in the main memory of the storage system. Buffer memory may be allocated statically to a particular process performing the data segmentation. Alternatively, the buffer memory may be allocated dynamically. For example, in a system configured to process multiple tape volumes in parallel and/or using more than one buffer per processed data stream, a number of available memory buffers may be allocated to a process upon reception of a new tape volume for its processing.

In a step S3, a tape volume is received from an application running on a host computer connected to the storage appliance, for example, by a local area network (LAN). For example, a backup application may request to load a particular tape volume or create a new tape volume for the virtual storage appliance. Subsequently, the application may write data using a predefined protocol such as the Small Computer System Interface (SCSI) over Fiber Channel (FC) protocol to write a new backup set to the tape volume.

In step S4, the segment buffer is filled with data received in step S3 from the application at an interface of the storage appliance. Due to the high bandwidth of main memory access, the data can be received with a high data rate, typically limited only by the bandwidth of the data connection or the application running on the host computer.

The data is continually filled into the buffer memory, until in a step S5, the buffered data segment is considered complete. The data segment is considered complete when either the maximum data size is available, i.e. when the buffer memory is completely filled, when the application writes a file mark (synchronization point), or when the application closes the tape volume, i.e. when the backup is complete. A file mark is used by tape applications to enforce the writing of all preceding data to a tape. Once the tape mark has been confirmed by a real or virtual tape drive, the application can assume that the data has been successfully written.

In part P2, the completed data segment is deduplicated and stored by the storage appliance.

In particular, when a segment is considered complete, it is passed for storage to the deduplication engine. In a step S6, the deduplication engine processes the data directly from the memory buffer. In the described example, deduplication is performed by logically splitting the buffered segment into smaller blocks of data, each block having a variable size between 16 kB and 64 kB. For each block, a hash value is calculated and then searched for in an index comprising all already known hash values. Different algorithms that determine blocks for deduplication and computing associated hash values are known and will therefore not be described here. If the hash value is already known, the deduplication engine compares the current block to one or more previously stored blocks having the same hash value. If a corresponding block has already been stored, a reference counter corresponding to this block will be increased by one. Otherwise, if no corresponding hash value or block is found, the data block has not been previously stored and will be stored by the deduplication engine for the first time. Accordingly, the corresponding reference counter will be set to one. As a result of step S6, the deduplication engine provides a reference to a data object such as a BLOB that corresponds to the compressed, deduplicated buffered segment. After recording the reference, the buffer itself may be cleared or otherwise released. For example, the same buffer may be used to buffer a subsequent segment of the current volume or may be released to a pool of empty buffers to be used for this or other volumes processed by the storage appliance.

In a step S7, appropriate metadata for later access to the deduplicated data segment will be recorded. For example, in an internal metadata database, an entry associating the reference to the data object provided in step S6 may be associated with the current tape volume. For example, the object identifier of a BLOB corresponding to the deduplicated segment may be added to an ordered set of object identifiers, which together represent the virtual tape volume.

In a step S8, the storage appliance checks whether the currently processed segment is the last segment of the volume. If this is the case, the closing of the volume can be confirmed to the application in a step S9 and the method ends.

Otherwise, in an optional step S10, the storage appliance may confirm a file mark to the application, if a "write file mark" operation was detected in step S5. For example, in a storage appliance using only one buffer per volume, the file mark may be confirmed as soon as the currently processed segment has been stored by the deduplication engine. In a storage appliance using multiple buffers per volume as described later, synchronization with the application is acknowledged in step S10 only after confirmation that all segments up to that point have been successfully stored with the deduplication engine.

The process is then repeated starting from step S3, until the data stream is closed by the application and, accordingly, the end of the tape volume is detected in step S5 and confined in steps S8 and S9 by the storage appliance.

Figure 2:
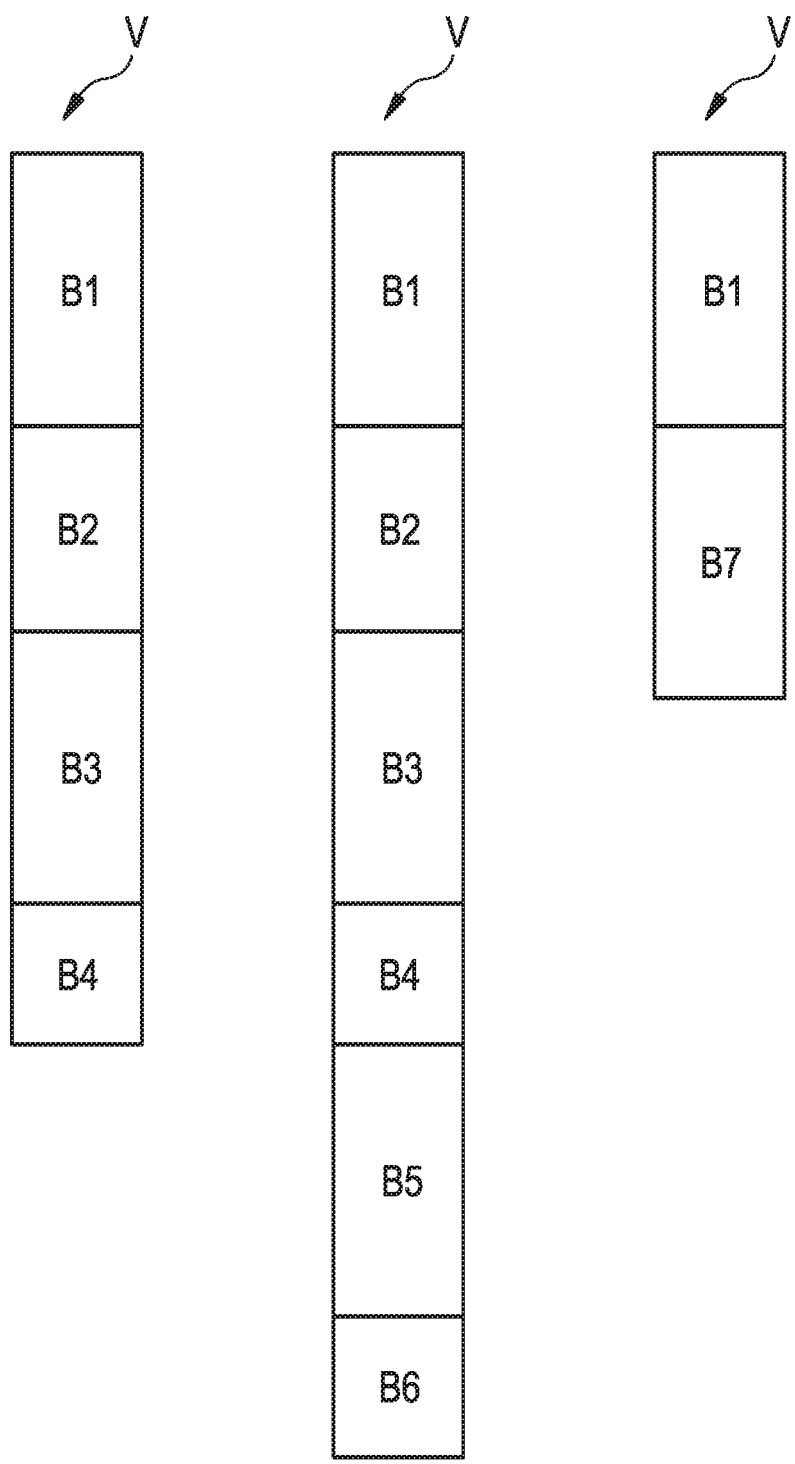
FIGS. 2A to 2C show a schematic diagram of logical tape volume comprising multiple data segments.

FIGS. 2A to 2C show a schematic diagrams of one logical tape volume after a first write operation, after an append operation and after a modify operation, respectively.

In general, tape volumes requested by an application are represented by virtual or logical volumes (LV) of the storage appliance. The terms "virtual volume" or "logical volume" are used in virtual tape libraries to better distinguish them from physical tape volumes used as back-end storage. Typically, a physical volume will comprise multiple logical volumes to optimize storage space.

With the described storage appliance, each virtual volume stored using the deduplication engine is managed using an ordered set of N data segments numbered from (indexed by) 0 to N−1. FIG. 2A shows a virtual volume V comprising four data segments B1 to B4. Note that the individual segments B1 to B4 do not need to have the same size. In particular, a file mark may have been written after segment B2, resulting in a shorter segment. Furthermore, the last segment of a logical volume will typically end before the memory buffer is completely filled, also resulting in a shorter segment B4.

In the example, virtual volume V represents a backup volume of an application after the initial backup of a storage device of a host computer. The volume of FIG. 2A can be represented by the ordered set [b1, b2, b3, b4], where b1 to b4 represent references to deduplicated data segments B1 to B4 whose content is stored in the dedup data pool of the deduplication engine.

If the application appends data to a volume V, i.e. by loading the virtual volume into the emulated tape device and writing new data without deleting the existing data, new segments are created, which get logically appended to the existing set of segments.

In FIG. 2B, additional data has been added to the storage device of the host computer. This additional data is backed up using an append operation that results in creation of two new segments B5 and B6. After completion of the append operation, the virtual volume V can be represented using the ordered set [b1, b2, b3, b4, b5, b6].

The tape semantic of the interface to the storage appliance may also allow replacement or modification of data in an existing volume. If new data is written in a segment K (0<=K<N), segment K is replaced with a new segment K' created with a read-modified-write operation. This means that segment K is loaded into a memory buffer, modified according to the application request and then written as a new segment K' using the deduplication engine. As a result, the previous segment K becomes invalid. Furthermore, as the storage appliance emulates a tape drives with associated tape semantics, all segments in the range K+1 . . . N−1 also become invalid.

FIG. 2C shows the same virtual volume V after it has been loaded and positioned at a data block falling into the original second data segment B2. During the modify operation, the data contained in segment B2 has be modified to form a new segment B7. After completion of the modify operation, the virtual volume V can be represented using the ordered set [b1, b7].

In the described example, a sequencing mechanism for segments ensures that the current valid version of a segment can be detected at any time. This ensures volume data integrity across possible component failures.

The above described segmentation of virtual volumes brings several advantages:

Only a small part of a volume (working set, one or few segments) needs to be buffered in main memory.

Append data to a volume means creating new segments that get appended to the existing segment list. No extra I/O for read-modify-write is necessary.

Modification of volume data requires only one segment to be read to perform a read-modify-write cycle.

Positioning to a specific location within a volume is very fast: The position within a volume is translated into a segment index, then the segment can be accessed directly, without the need to read (re-duplicate) segments before the requested position.

According to a further example, various features for performance enhancements can be implemented if more than one memory buffer is available for processing a tape volume.

1) Streaming Mode to Sequentially Write a Virtual Volume:

By providing multiple segment buffers per virtual volume and applying a "write behind" method of storing the individual segments using the deduplication engine, the write performance is boosted. While segment K is asynchronously stored to the deduplication engine, it is possible to receive more data from the application and fill segment K+1 into another segment buffer memory. When synchronization points are hit—when a file mark is written or the volume is closed—the system ensures that all outstanding store requests are finished before the last operation is acknowledged to the application.

2) Streaming Mode to Sequentially Read a Virtual Volume:

When the system detects that volume data is sequentially read it performs "read ahead" of segments into additional memory buffers. That is, when data from segment K is requested, a retrieve operation is not only started for segment K, but also asynchronously for segment K+1. Later when data from segment K+1 is requested the data is already available in a memory buffer and can be served without further delay.

Figure 3:
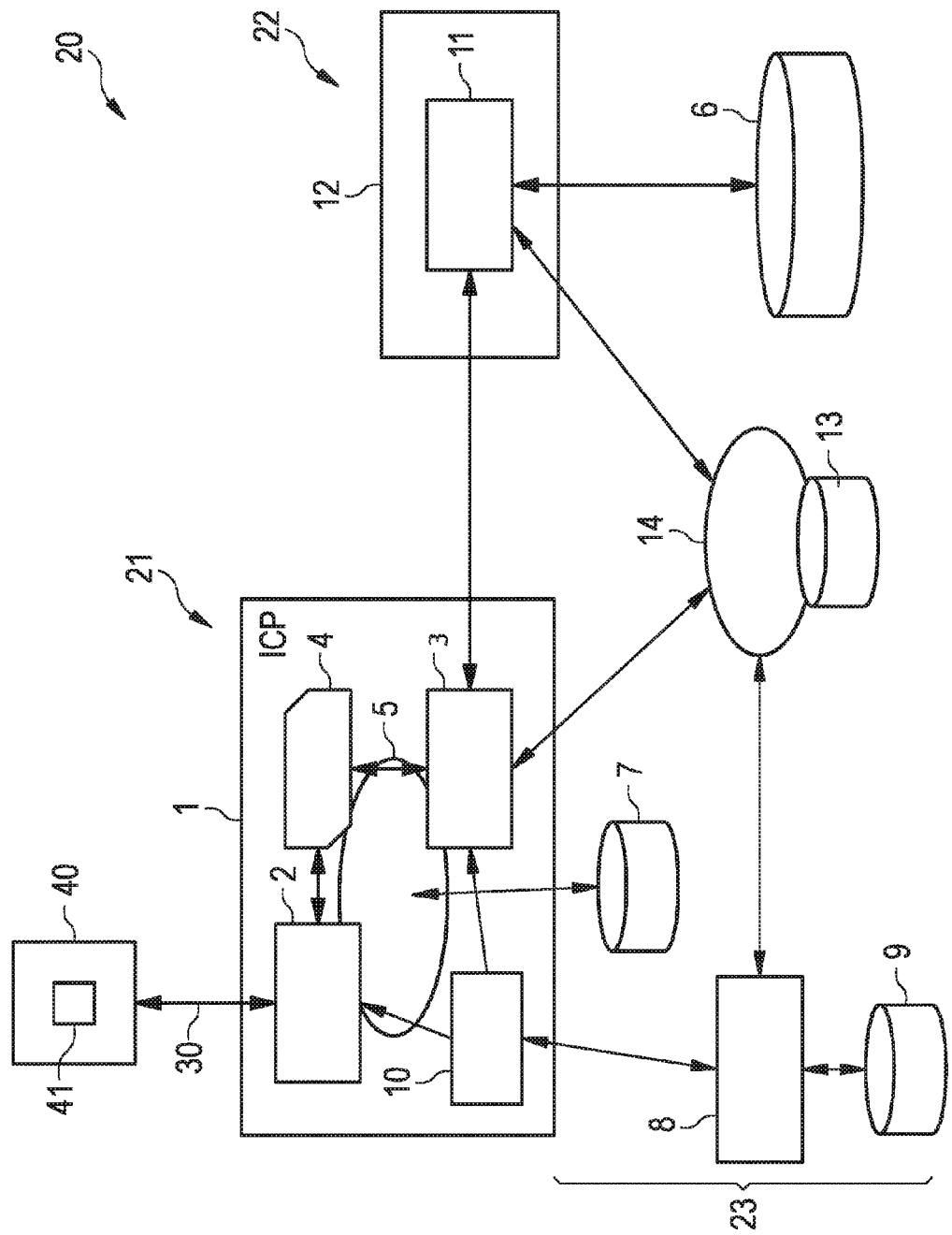
FIG. 3 discloses a system architecture of a storage appliance according to an example.

FIG. 3 shows an Architecture for Inline Deduplication of Virtual volumes according to an example.

According to FIG. 3, a storage appliance 20 in the form of a virtual tape library is implemented as a cluster system comprising at least two cluster nodes 21 and 22 and at least one mass storage system 23. The cluster system may comprise further cluster nodes, storage systems and interfaces not shown for representational simplicity. The storage appliance 20 connects via an interface 30 to a host computer 40. The host computer 40 runs one or more applications 41 such as backup and archiving software.

Tape emulations and a dedup client 3 run on one or more ICPs (Integrated Channel Processors) 1. The ICP 1 provides one or more logical (tape) drives (LDs) for application data read/write requests of media servers using a tape emulation module 2. For example, a tape drive according to the Linear Tape Open (LTO) specification may be emulated. In the described example, one or more ICPs 1 may run on a cluster node 21 of the cluster system, e.g. in the form of rack servers arranged in a common rack (not shown).

Each tape emulation module 2 handling a virtual volume stored using data deduplication, also referred to as "dedup LV", is associated with the dedup client 3 and exchanges data with it through shared memory buffers 4. In the described example, the dedup client 3 is implemented as a software module running on the same cluster node 21 as the tape emulation module 2. Data transfer through shared memory is handled by a software layer implementing a distributed tape volume file system, referred to as DTVFS layer 5.

In the described example, the tape emulation module 2 will be able to handle both "new style" LVs (dedup type LVs, stored in a dedup data pool 6) and legacy type LVs (handled through a Tape Volume Cache (TVC) 7. However, in other implementations, separate ICPs 1 and/or software modules may be used to handle dedup LVs and legacy type LVs. Moreover, if all data is stored in deduplicated form, no support for legacy type LVs is required at all. In the described example, the TVC 7 acts as a cache for logical volumes and is implemented on a RAID disk storage system. However, as the TCV 7 is not relevant for the described segmentation and deduplication system, its data content will not be described.

Knowledge about the LV type is available from a virtual library manager (VLM) 8 based on configuration information stored in a corresponding database 9 for each logical volume group (LVG). Through the VLM 8, an internal or external application 41 can request mounting of a particular LV into a logical tape drive. At LV mount time, the VLM 8 will inform the DTVFS layer 5 on the ICP 1 about the type of LV, which is currently loaded in a logical drive. In the example shown in FIG. 3, this information is provided by a Virtual Mount Daemon (VMD) 10 on the ICP 1. However, in another example, the VLM 8 may communicate directly with the tape emulation module 2, the dedup client 3 and/or the DTVFS layer 5.

If a loaded volume is a "dedup type" LV, the VIVID 10 will bind the dedup client 3 to the LV. The dedup client 3 will be prepared to handle I/O to/from the dedup data pool 6 using a dedup server 11. In the described example, the dedup server 11 is implemented as a software module. However, the dedup server 11 may also be implemented partly or completely in hardware. In the described example, the dedup server 11 is running on a dedicated integrated device processor (IDP) 12. In the described example, the IDP 12 preferably runs on a separate cluster node 22 of the cluster system. However, in small installations or after failure of one or more cluster nodes, the IDP 12 may also be executed on the some cluster node 21 as the ICP 1.

In the described example, the dedup data pool 6 is located on a General Parallel File System (GPFS). From the storage appliance ETERNUS CS point of view, a new file system type (BLOCKPOOL-FS) is used for storage. The data exchange between the dedup client 3 and the dedup server 11 is performed using a LAN, e.g. an internal 10 GBit-Ethernet connection, between the individual nodes 21 and 22 of the cluster system. The dedup client 3 will operate in a mode where a considerable part of data deduplication processing is done within its context (client side deduplication) and will communicate with the dedup server 11 using a controlled transfer protocol (BNP). In particular, the dedup client 3 may calculate hash values for data blocks of a segment stored in a shared memory buffer. The dedup server 11 may then be queried for the existence of the calculated hash value. Only if the block is previously unknown to the dedup server 11, the block will be transferred to the dedup server 11 for storage. Of course, for the sake of efficiency, multiple queries and/or blocks of data may be transferred in a common request to the dedup server 11. Within the context of backup and archiving solutions, the probability of hash collisions, i.e. the occurrence of identical hash values for distinct blocks of data, is extremely low. Therefore, the potential occurrence of a hash collision is not dealt with in the described solution. Nonetheless, hash collisions can be detected and dealt with by other known methods such as the use of CRC values or other checksums, calculated on a volume or application level.

The metadata for LVs stored in the dedup data pool 6 is maintained in the Dedup Volume Management Data Base (DVM DB) 13. The LV segments to BLOB tag mappings are stored here. Internal applications such as the VLM 8 or the dedup clients 3 access the database 13 through a DVM library 14 that implements an API for access to the database 13.

As mentioned before, the described systems and methods may be implemented using hardware or software, or preferably, a combination of both. In particular, a cluster system comprising a plurality of interconnected cluster nodes and having a software program stored on a non-transitive storage medium may be employed to implement the method.

The invention claimed is:

1. A storage appliance comprising:
an interface that provides access to at least one virtual tape drive for at least one host computer;
a first database that stores metadata about virtual tape volumes received via the interface,
at least one volatile memory; and
a deduplication engine that deduplicates storage objects;
wherein each virtual tape volume is represented within the storage appliance as an ordered set of segments of data and the storage appliance is configured to perform the following steps:
defining a maximum segment size based on an amount of main memory available for a computer system performing segmentation;
providing, from a volatile memory, at least one buffer memory of the defined maximum segment size to store a segment of data;
receiving a data stream representing a virtual tape volume of the at least one virtual tape drive at the interface;
filling the at least one buffer memory with data from the received data stream until the received data stream is closed, a synchronization point of the virtual tape volume is identified in the received data stream or an amount of data corresponding to the defined maximum segment size has been stored in the at least one buffer memory such that the at least one buffer memory is completely filled;
deduplicating with the deduplication engine the segment of data stored in the at least one buffer memory; and
storing the deduplicated segment of data in a non-volatile storage device.

2. The storage appliance according to claim 1, wherein the metadata stored in the first database comprises mappings of segments of each virtual tape volume to tags of a binary large object, BLOB, corresponding to the deduplicated segment of data.

3. The storage appliance according to claim 1, wherein the virtual tape volume of the at least one virtual tape drive has a capacity exceeding the defined maximum segment size.

4. The storage appliance according to claim 3, wherein the virtual tape volume of the at least one virtual tape drive has a capacity of at least 200 GB and the defined maximum segment size is smaller than 200 GB.

5. The storage appliance according to claim 1, wherein the storage appliance is configured to process a plurality of virtual tape volumes of the at least one virtual tape received in parallel, and, for each one of the plurality of virtual tape volumes received in parallel, a separate buffer memory that stores a segment of data of the respective virtual tape volume is provided.

6. The storage appliance according to claim 1, wherein the storage appliance is configured to provide, from the volatile memory, a plurality of buffer memories, each buffer memory storing a segment of data and, wherein, while deduplication and/or storing of a segment of data received from the data stream and stored in a first buffer memory is performed, at least one second buffer memory is filled with data of a subsequent segment from the received data stream.

7. The storage appliance according to claim 6, wherein a received file mark, which is used by tape applications to enforce the writing of all preceding data to a tape, is only acknowledged to an application after all segments of data preceding the file mark have been successfully processed and stored by the deduplication engine.

8. The storage appliance according to claim 1, wherein, if a first segment of data is requested via the interface, the first segment of data is read and re-duplicated by the deduplication engine and provided to the interface and, before a subsequent request for a subsequent second segment of data is received, the second segment of data is read and re-duplicated by the deduplication engine and stored in the at least one memory buffer.

9. The storage appliance according to claim 8, wherein, on receipt of the subsequent request for the second segment of data, the second segment of data is provided from the at least one buffer memory to the interface.

10. The storage appliance according to claim 1, further comprising at least one Integrated Channel Processor that provides access to the at least one virtual tape drive for the at least one host computer, wherein the Integrated Channel Processor and the deduplication engine exchange data through at least one shared memory buffer.

11. The storage appliance according to claim 10, wherein, on mounting a virtual tape volume, the storage appliance determines, based on configuration information, whether the virtual tape volume comprises deduplicated segments of data, and, if the virtual tape volume comprises deduplicated segments of data, the deduplication engine is assigned to the Integrated Channel Processor to handle input/output requests.

12. The storage appliance according to claim 1, further comprising at least one Integrated Channel Processor that runs a de-duplication client and at least one Integrated Device Processor that runs a deduplication server.

13. A storage appliance comprising:
an interface that provides access to at least one virtual tape drive for at least one host computer;
a first database that stores metadata about virtual tape volumes received via the interface,
at least one volatile memory; and
a deduplication engine that deduplicates storage objects;
wherein each virtual tape volume is represented within the storage appliance as an ordered set of segments of data and the storage appliance is configured to perform the following steps:
providing, from a volatile memory, at least one buffer memory to store a segment of data;
receiving a data stream representing a virtual tape volume of the at least one virtual tape drive at the interface;
filling the at least one buffer memory with data from the received data stream until the received data stream is closed, and a synchronization point of the virtual tape volume is identified in the received data stream or a predefined amount of data has been stored in the buffer memory;
deduplicating with the deduplication engine the segment of data stored in the at least one buffer memory; and
storing the deduplicated segment of data in a non-volatile storage device;
wherein data of an existing virtual tape volume is modified by:
identifying an index of a first segment of data to be modified;
reading and re-duplicating the deduplicated first segment from the deduplication engine into a memory buffer;
invalidating all segments of data having an index equal to or greater than the identified index and deleting the corresponding indices from the ordered set;
creating a new segment of data based on the buffered first segment and a modification request received from the interface;
deduplicating and storing the new segment; and
adding the index of the new segment to the end of the ordered set.

14. The storage appliance according to claim 13, wherein data received from the interface is appended to an existing virtual tape volume by:
creating additional segments for the data to be appended;
deduplicating and storing the additional segments, and
adding indices of the additional deduplicated segments to the end of the ordered set.

15. The storage appliance according to claim 13, wherein data of the existing virtual tape volume is read from a predetermined position of the virtual tape volume by:
identifying an index of a first segment of data to be read;
reading and re-duplicating the first segment by the deduplication engine into a memory buffer without previously re-duplicating any segment having a lower index than the first segment; and
providing the data from the predetermined position from the at least one buffer memory via the interface.

16. A method of segmenting a virtual tape volume provided by an application via an interface to a storage virtualization appliance, the storage virtualization appliance comprising a deduplication engine and a volatile memory, wherein each virtual tape volume is represented within the storage virtualization appliance as an ordered set of segments of data, the segmentation of the virtual tape volume is based on a tape semantic of the interface of the storage virtualization appliance and is performed by repeating the following steps:
defining a maximum segment size based on an amount of main memory available for a computer system performing the segmentation;

providing, from the volatile memory, at least one buffer memory of the defined maximum segment size to store a segment of data of the virtual tape volume;

filling the at least one memory buffer with data of the virtual tape volume received from the application until a segment of the virtual tape volume is considered complete, wherein the segment is considered complete when the at least one memory buffer has been filled to the defined maximum segment size such that the at least one memory buffer is completely filled, when the application writes a file mark serving as an synchronization point or when the virtual tape volume is closed by the application;

passing a segment of the virtual tape volume for storage to the deduplication engine when the segment is considered complete, and processing, by the deduplication engine, the passed segment of the virtual tape volume directly from the at least one memory buffer for deduplicated storage.

17. The method according to claim 16, further comprising storing metadata about virtual tape volumes received via the interface in a first database of the storage virtualization appliance.

18. The method according to claim 16, further comprising providing access to the at least one virtual tape drive for the application by means of at least one Integrated Channel Processor of the storage virtualization appliance, wherein the Integrated Channel Processor and the deduplication engine exchange data through at least one shared memory buffer.

19. The method according to claim 16, further comprising running a de-duplication client by at least one Integrated Channel Processor of the storage virtualization appliance and running a deduplication server by at least one Integrated Device Processor of the storage virtualization appliance.

20. The method according to claim 16, further comprising the following steps:
receiving a modification request from the interface;
identifying an index of a first segment of data to be modified;
reading and re-duplicating the deduplicated first segment from the deduplication engine into the at least one memory buffer;
invalidating all segments of data having an index equal to or greater than the identified index and deleting the corresponding indices from the ordered set;
creating a new segment of data based on the buffered first segment and the received modification request;
deduplicating and storing the new segment; and
adding the index of the new segment to the end of the ordered set.

* * * * *